Patented Jan. 13, 1931

1,788,371

UNITED STATES PATENT OFFICE

ARNOLD DOSER, OF COLOGNE-MULHEIM, AND ALFRED THAUSS, OF COLOGNE-DEUTZ, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

NEW CONDENSATION RESIN PHENOL PRODUCTS

No Drawing. Application filed January 28, 1928, Serial No. 250,332, and in Germany February 1, 1927.

The present invention concerns new condensation products obtainable from natural resins and phenols and their sulfonated derivatives and a process of preparing same.

According to our invention the new products are prepared by condensing natural resins for instance, colophony with phenols such as phenol or $\alpha$-naphthol in the presence of aqueous mineral acids, for instance, diluted sulfuric acid, which does not act as a sulfonating agent, for several hours while heating.

The new products are stable compounds from which the phenol cannot be separated by alkali or by steam distillation; they are yellowish to brown colored resinlike substances, insoluble in water, soluble in aqueous alkaline solutions, from which by the addition of acid the condensation product is precipitated again. In the usual organic solvents, such as alcohol, ether, benzene, and acetic anhydride they are easily soluble.

By treating them with a sulfonating agent such as sulfuric acid monohydrate, watersoluble sulfonic acids of the condensation products are obtained which are valuable tanning agents.

The following examples will illustrate our invention, the parts being by weight:

Example 1

A solution of 30 parts of colophony and 15 parts of phenol with the addition of 1,5 parts of sulfuric acid of 60° Bé. are heated to 70–80° C. during 8 hours. From the reaction mass the superfluous phenol is separated by steam distillation. The new compound is a viscous resinlike substance showing no more the Storch-Morawski reaction on colophony; (see Zeitschrift für angewandte Chemie 1927, Seite 100). A solution in acetic anhydride with the addition of a drop of concentrated sulfuric acid gives a reddish coloration. The condensation product is dissolved in carbon tetrachloride and sulfonated with 80 parts of sulfuric acid monohydrate during four hours at a temperature of about 10° C. The reaction mass is placed on ice and the precipitated sulfonated mass is pressed to form a cake of resin. It is dissolved in hot water and salted out, precipitating in form of brownish flakes, melting together to form a cake on heating.

Example 2

100 parts of colophony and 50 parts of $\alpha$-naphthol are melted together at a temperature of 110°, 2 parts of sulfuric acid of 60° Bé. being added to the melt. Then the temperature is raised to about 120° C. and kept at this temperature for about 8 hours. The reaction product shows no more the presence of unchanged colophony. The melt is dissolved in carbon tetrachloride and sulfonated with 300 parts of sulfuric acid monohydrate at temperatures from 10–15° C. The reaction mass is worked up as described in Example 1.

We claim:

1. The process of preparing new condensation products, which process comprises heating a mixture of a natural resin and a phenol with an aqueous mineral acid.

2. The process of preparing new condensation products which process comprises heating a mixture of colophony and phenol with diluted sulfuric acid.

3. The new condensation products obtainable by heating a mixture of a natural resin and a phenol with an aqueous mineral acid, being generally yellowish to brown substances, insoluble in water, soluble in aqueous alkaline solutions and in organic solvents.

4. The new condensation product obtainable by heating a mixture of colophony and phenol with diluted sulfuric acid, being a yellowish resinlike substance, insoluble in water, soluble in aqueous alkaline solutions and in organic solvents.

In testimony whereof we have hereunto set our hands.

ARNOLD DOSER.
ALFRED THAUSS.